(12) United States Patent
Yamashita (10) Patent No.: US 6,544,659 B2
(45) Date of Patent: Apr. 8, 2003

(54) COATED STEEL HAVING ATMOSPHERIC CORROSION RESISTANCE

(76) Inventor: Masato Yamashita, 5-12 Bussyoden, Enmyoji, Ohyamazaki-cho, Otokuni-gun, Kyoto-fu (JP)

( * ) Notice: Subject to any disclaimer, the term of this patent is extended or adjusted under 35 U.S.C. 154(b) by 86 days.

(21) Appl. No.: 09/784,009

(22) Filed: Feb. 16, 2001

(65) Prior Publication Data

US 2001/0021456 A1 Sep. 13, 2001

(30) Foreign Application Priority Data

Feb. 18, 2000 (JP) ........................................ 2000-040853

(51) Int. Cl.$^7$ .......................... B32B 15/18; B32B 15/08
(52) U.S. Cl. ...................... 428/471; 428/684; 428/626; 428/632; 428/472; 428/704; 428/469
(58) Field of Search ............................ 428/472.2, 472.3, 428/457, 471, 470, 469, 332, 334, 335, 681, 684, 685, 632, 639, 640, 624, 625, 626, 704, 699, 687, 472

(56) References Cited

U.S. PATENT DOCUMENTS

| | | | |
|---|---|---|---|
| 4,225,352 A | * | 9/1980 | Makino et al. .......... 106/14.21 |
| 5,037,478 A | * | 8/1991 | Okai et al. ................... 106/479 |
| 5,658,668 A | * | 8/1997 | Kobayashi et al. .......... 428/418 |
| 5,708,117 A | * | 1/1998 | Becker et al. ................. 528/60 |
| 5,897,948 A | * | 4/1999 | Sakon et al. ................. 428/328 |
| 6,200,672 B1 | * | 3/2001 | Tadokoro et al. ........... 428/328 |

FOREIGN PATENT DOCUMENTS

JP 2666673 B2 10/1997

* cited by examiner

Primary Examiner—Michael La Villa
(74) Attorney, Agent, or Firm—Shinjyu Global IP Counselors, LLP (57) ABSTRACT

The object of the present invention is to provide a coated steel having an ability to form a high corrosion-resistant rust layer in an early stage even in a severely corrosive environment, for example one with a high amount of atmospheric salinity, by applying a surface treatment which is economical and easily applied onto surfaces of a weather resistant steel and normal steel or surfaces of rust layers over these steels. A surface of a steel or a surface of a rust layer over a steel is coated with an organic resin paint comprising, by weight, 0.2 to 60% of the total with a composition of (i) 0.1–30% calcium oxide, (ii) a metal sulfate whose solubility is 1 g or more in 100 g of water at 5 degrees C and (iii) at least one or more kind(s) of phosphoric acid, the dried coating film having a thickness between 1 $\mu$m and 200 $\mu$m.

8 Claims, 1 Drawing Sheet

COATED STEEL HAVING ATMOSPHERIC CORROSION RESISTANCE

BACKGROUND OF THE INVENTION

1. Field of the Invention

The present invention generally relates to coated steels having atmospheric corrosion resistance. More specifically, the present invention relates especially to steel that can relatively quickly form an extremely high protective rust layer (hereinafter referred to a high corrosion-resistant rust layer) on a surface of the steel in an atmospherically corrosive environment, the high corrosion-resistant rust layer being effective even in an intensely corrosive environment such as one with a relatively high amount of airborne sea salt.

2. Background Information

Commonly, corrosion resistance of steel in the atmosphere can be improved by adding a small amount of an element such as P, Cu, Cr, and/or Ni. These low alloy steels are called weather resistant steels and within several years of being exposed form a protective rust which can protect against corrosion (hereinafter referred to protective rust). They are what we call maintenance-free steels and do not need corrosion-resistant treatments like painting after rust forms.

However, a relatively long period of time, usually more than 10 years, is required until a protective rust layer has formed. Prior to the formation of the protective rust layer, a float rust and flow rust, such as red and yellow rusts will most likely have formed by initial corrosion. Those rusts are undesirable in appearance and also cause damage by severely decreasing the thickness of steel plates by corrosion. In particular, in an environment that includes airborne grains of sea salt, the protective rust layer is not able to form regardless of the amount of time the steel is exposed. The ability of this protective rust to protect steel deteriorates when atmospheric salinity is rather large. Further, the maximum limit of atmospheric salinity that is allowed during the formation of a high corrosion-resistant rust layer is extremely low.

Concerning this problem, a surface treatment method forming a phosphate film has been proposed and disclosed in JP. Pat. No. 01-142088. However, the treatment procedure is complicated as, for example, it requires an appropriate pretreatment before forming a phosphate film. In addition, it is not easy to perform the treatment during welding. Thus, there are difficulties in the application of this method to architectural structures and the like.

Meanwhile, a method of forming protective rust while inhibiting initial corrosion by a resin film was proposed and disclosed in JP. Pat. No. 53-022530. However, it has been proven that in an intensely corrosive environment, initial corrosion is not sufficiently inhibited and promotion of the forming protective rust deteriorates by this method. On the other hand, a method using a two-layered film was disclosed in JP. Pat. No. 56-033911. By this method, initial corrosion can be controlled but its corrosion resistant ability is so high that a quite long period of time that must elapse before a protective rust forms. Additionally, this method is problematic because it is not easily executed.

All of the methods disclosed in the prior art have difficulty in forming a protective rust in a severely corrosive environment, especially in an environment that includes a relatively high amount of atmospheric salinity. Further, the corrosion resistance of these methods is insufficient.

In view of the above, there exists a need for a coated steel having an ability to form a high corrosion-resistant rust layer in an early stage even in a severely corrosive environment which overcomes the above mentioned problems in the prior art. This invention addresses this need in the prior art as well as other needs, which will become apparent to those skilled in the art from this disclosure.

SUMMARY OF THE INVENTION

An object of the present invention is to provide a coated steel having an ability to form a high corrosion-resistant rust layer in an early stage even in a severely corrosive environment by applying a surface treatment that is economical and easy to apply onto a surface of a weather resistant steel, normal steel or the like or a surface of a rust layer over these steels.

A first aspect of the present invention is to provide a coated steel with atmospheric corrosion resistance. The coated steel has a steel body and an organic paint layer that coats the body. The layer includes 0.1–30% by weight of calcium oxide, and 0.2 to 60% by weight of a combination of metal sulfate(s) and phosphoric acid. The metal sulfate has a solubility of 1 g or more in 100 g of water at 5 degrees centigrade. The layer is between 1 $\mu$m and 200 $\mu$m in thickness.

A second aspect of the present invention is to provide a coated steel with atmospheric corrosion resistance. The steel has a steel body, and an organic paint layer that coats the body. The layer includes 0.1–30% by weight of calcium oxide, and 0.2 to 60% by weight of metal sulfate(s). The metal sulfate has a solubility of 1 g or more in 100 g of water a 5 degrees centigrade. The layer is between 1 $\mu$m and 200 $\mu$m in thickness.

A third aspect of the present invention is to provide a coated steel having atmospheric corrosion resistance. The coated steel has a steel body and an organic paint layer. The organic paint layer coats the steel body. The layer includes 0.1–30% by weight of calcium oxide, and 0.2 to 60% by weight of phosphoric acid. The layer is between 1 $\mu$m and 200 $\mu$m in thickness.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
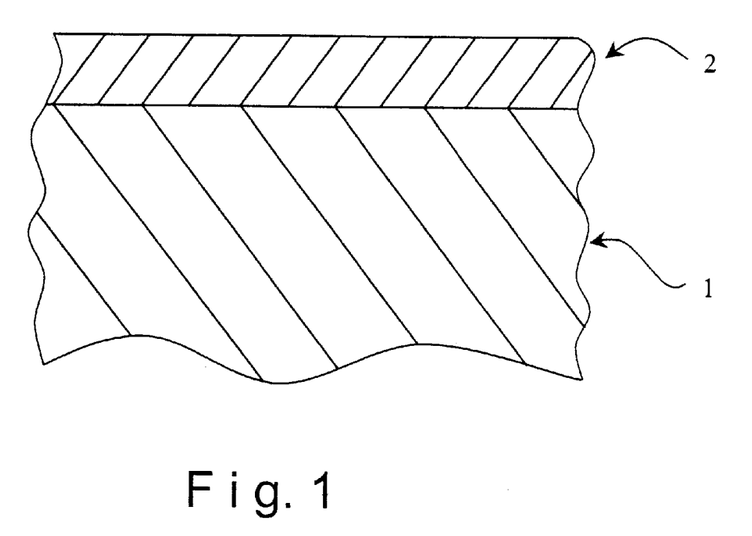
FIG. 1 is a partial cross-sectional view showing a steel plate covered with an organic resin paint in accordance with an embodiment of the present invention.
Figure 2:
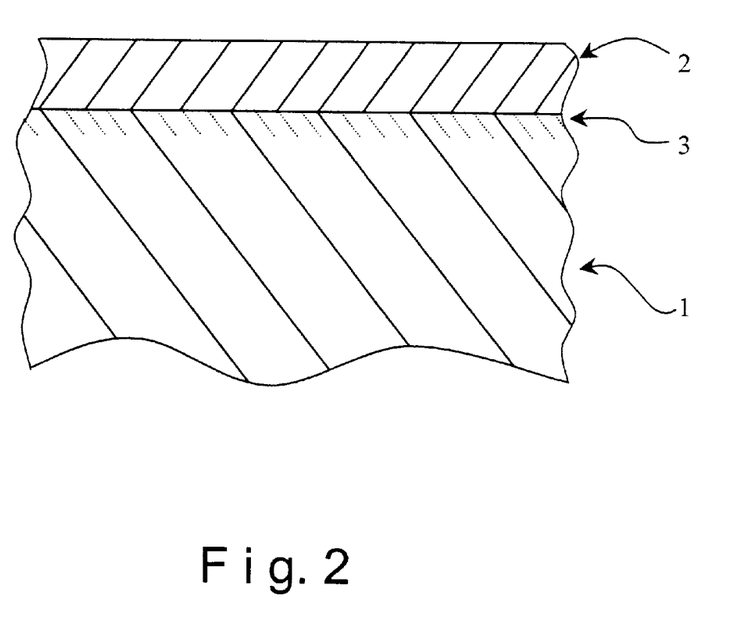
FIG. 2 is a partial cross-sectional view showing the steel plate of FIG. 1 with a protective rust layer formed between the plate and paint.

FIG. 1 shows a steel 1 having a surface covered with an organic resin paint 2. FIG. 2 shows the steel 1 and organic resin paint 2 with a rust layer 3 that has formed therebetween. Referring to FIG. 2, the present inventor has strenuously studied the matter and made it clear that, concerning steel 1 materials, a rust layer 3 simultaneously including a metal ion, sulfuric acid ion, and calcium ion shows a high level of corrosion resistance. Therefore, to form a high corrosion-resistant rust layer 3 in an early stage, it was found important to provide a positive metal ion, sulfuric acid ion, and/or calcium ion onto a surface of the steel 1.

As best seen in FIGS. 1 and 2, the inventor's further strenuous study resulted in finding a practical solution to applying an appropriate amount of organic resin paint 2 onto the surface of a steel 1 or the surface of the rust layer 3 covering the steel 1 when a high corrosion-resistant rust layer 3 is formed in its early stage in accordance with corrosion of the steel 1. The organic resin paint 2 includes (i) an appropriate amount of calcium oxide, either (ii) an appropriate amount of metal sulfate having more than a certain level of solubility to water or (iii) an appropriate amount of phosphoric acid or both of (ii) and (iii).

The following is an explanation of the numerical limitation of each ingredient of the present invention and its effect.

(1) The effect of calcium oxide is outlined as follows:

When a rust layer 3 has low corrosion resistance, the rust layer 3 is coarse. This is because there are many apertures and the like. Furthermore, the permeation of water, oxygen, and various corrosive materials that exist in a corrosive outdoor environment and are introduced into the surface of the steel 1 cannot be controlled. Namely, in order to form a high corrosion-resistant rust layer 3, the grains of a rust layer 3 should be improved and made finer.

Calcium oxide partially changes to calcium hydroxide when it comes into contact with water. When water is supplied to the surface of a coated steel 1 in a corrosive environment, the calcium oxide that exists in a coating film, which has formed after the drying of an organic resin paint 2, provides calcium ions after changing into calcium hydroxide. Calcium ions created in this way react to sulfuric acid ions created by dissociation of metal sulfate, which were also added to the coating film, and form calcium sulfate that is nearly insoluble in water. The calcium sulfate has an effect of improving the grain of a protective layer by making it finer. The calcium sulfate fills apertures in the rust layer 3, whose main ingredients are oxyiron hydroxide and iron oxide created by a corrosive reaction in accordance with the formation of calcium sulfate.

Such an effect of the calcium ion is also displayed in the formation of calcium phosphate as the calcium ion reacts not only to sulfuric acid ion but also to phosphoric acid ion. Namely, the main effect of calcium oxide is to inhibit the permeation of such materials as water, oxygen, salinity, and sulfuric acid gas, which intensely accelerate the corrosion of steel 1, from the outside environment through the rust layer 3. In order to do that, a nearly insoluble salt is consequently created by the simultaneously existing phosphoric acid ion and sulfuric acid ion. Then, the grains of the rust layer 3 are improved by being made finer by having apertures in the rust layer 3 filled with that salt.

At the same time, the sulfuric acid ion created by dissociation accelerates an eluting reaction of iron, which is an extreme initial corrosion of steel 1. This has an effect of forming a rust layer 3 in an early stage. In addition, the hydroxide ion created by dissociation of calcium hydroxide raises the pH of the surface of the steel 1. Then, the hydroxide ion precipitates the iron ion, which is consequently produced by an accelerated eluting reaction of iron by the effect of the sulfuric acid ion. The hydroxide ion is in the form of, for example, as oxide and oxyhydroxide in its early stage. This reaction also has an effect of forming a rust layer 3 earlier.

Part of calcium oxide produces metal oxide along with calcium sulfate by directly reacting to metal sulfate. The calcium sulfate produced in this way has the same effect of improving the grain of a rust layer 3 by making it finer as described above. Meanwhile, metal oxide is nearly insoluble to water and has the same effect of improving the grain of the rust layer 3 by making it finer. Further, this metal oxide has a tendency to cohere closely with each other because it is composed of extremely fine crystals. Thus, it displays a particularly high effect of improving the grain of the rust layer 3 by making it finer.

To obtain such effects as described above, 0.1 wt % or more calcium oxide is needed in an organic resin paint 2. Meanwhile, if calcium oxide is added over 30 wt %, not only does the organic resin paint 2 become quite fragile after drying but also calcium oxide will exist in clusters in a coating film. Then, when water is supplied, those clusters of calcium oxide will dissolve providing pinhole-like omissions in the coating film and extremely accelerate corrosion. Therefore, the amount of calcium oxide to add is limited to 0.1–30 wt %.

(2) The effects of metal sulfate and phosphoric acid are outlined as follows:

A metal sulfate, or sulfates, whose solubility is 1 g or more in 100 g of water at 5 degrees C dissociates into metal ion and sulfuric ion when water is supplied at room temperature. As described above, dissociated sulfuric acid ion reacts to calcium ion and forms calcium sulfate, which is nearly insoluble in water. Then, the calcium sulfate fills apertures in the rust layer 3, whose main ingredients are oxyiron hydroxide and iron oxide created by a corrosive reaction of the steel 1. In this way, grains of the rust layer 3 are improved by being made finer. These effects can be obtained by adding phosphoric acid and calcium oxide simultaneously without adding metal sulfate because the same effects are displayed by calcium phosphate created by a reaction between the calcium ion and phosphoric acid ion. Therefore, phosphoric acid is selected as one of the compounds that can be added together with calcium oxide.

A metal sulfate whose solubility is 1 g or more in 100 g of water at 5 degrees C. is selected because if the metal sulfate solubility were any lower, the required amount of metal and sulfuric acid ion to obtain the effect described above cannot be provided when water is supplied only from dew and rain, especially in low winter temperatures. Examples of metal sulfate include aluminum sulfate, Nickel (II) sulfate, Cobalt(II) sulfate, Chromium(III) sulfate, Copper(II) sulfate, and Iron(III) sulfate.

In addition, metal ion produced by dissociation has an effect of connecting iron oxide and oxyiron hydroxide closer, which are in the rust layer 3.

The minimum total amount of ingredients of (i) a metal sulfate whose solubility is 1 g or more in 100 g of water at 5 degrees C., (ii) one or more kind(s) of phosphoric acid, and (iii) calcium oxide being limited to 0.2 wt %. If the total amount is less than the minimum, the expected effect cannot be obtained. In addition, the maximum of the total amount is limited to 60 wt %. If the ratio exceeds the maximum, the organic resin paint 2 becomes fragile after it has dried. Thus, it becomes impossible to obtain the effect described above because the coating film can be peeled off or weathered before a high corrosion-resistant rust layer 3 forms.

(3) The effects of an organic resin coating paint are outlined as follows:

An organic resin coating paint has a role of holding calcium oxide, metal sulfate, and phosphoric acid on the surface of a steel 1 and preventing them from dissapating with dew and rain before their effects appear. Further, until the high corrosion-resistant rust layer 3 forms, this coating film acts as a barrier to inhibit moderately permeation of corrosion promoting materials from the outside to the surface.

The thickness of the dried organic resin film is limited to between 1–200 $\mu$m. If the thickness of the dried film is thinner than 1 $\mu$m its effect as barrier deteriorates and it cannot perfectly prevent the iron ion created by corrosion of foundational steel 1 from seeping out. As a result, the so-called flow rust, which flows out from the surface of the steel 1, is created and flows out together with active principles of added calcium oxide and either metal sulfate or phosphoric acid. Therefore, expected effects of those active principles cannot be obtained. Moreover, in an environment that includes a high amount of airborne sea salt grains, formation of high corrosion-resistant rust layer 3 is inhibited by excessive corrosion caused by the permeation of the chloride ion.

Meanwhile, if the thickness of the dried film is over 200 $\mu$m, it is not only economically disadvantageous but also the barrier effect is so strong to the rust-free foundation that it takes too much time to form a high corrosion-resistant rust layer 3 on the surface of the foundational steel 1. If the coating film peels off before the high corrosion-resistant rust layer 3 forms, excessive corrosion can progress from the now exposed parts without the holding effects of organic resin coating. Therefore, the thickness of the dried film is limited to 200 $\mu$m or less.

In the present invention, there is no limitation in particular as to which organic resin to use. Resins such as epoxy resin, urethane resin, vinyl resin, butyral resin, and phthalic acid resin can be used. Though the resins described above are used in the form of paint, the paint can be either solvent-based or water-based.

Moreover, organic resin paint 2 of the present invention can contain coloring agents like Indian red, constitutional agents like silica, rust preventive agents like zinc chromate, and other certain general additives such as thixotropic agent, dispersing agent, antioxidants besides calcium oxide, metal sulfate, phosphoric acid. Though rust preventive agents can be added to control corrosion in an intensely corrosive environment the added amount is preferred to be 10 mass % or less so as not to offer excessive corrosion resistance.

Concentrations of additives such as calcium oxide, metal sulfate, and phosphoric acid in an organic resin paint 2 described herein are referred to as dried and solid ones. Needless to say, those additives are prepared to have a suitable viscosity for painting work before the application. The solvent undergoes natural evaporation after being painted. In this way, a coating film having an expected dried thickness is formed.

The organic resin films described above can be applied by general painting methods such as air spraying, airless spraying, and with a brush. Thus, the application can be performed most anywhere. Further, it is economically advantageous because only one application of paint is enough to obtain the desired effects. Moreover, as the on-site application is possible, it can be applied after steel 1 was processed such as cut and welded.

The type of steel 1 used in the present invention is not limited. Either normal steel 1 or weather-resistant steel 1 can be used. Namely, even normal steel 1 can display high corrosion-resistance because its rust eventually changes to a chemically stable high corrosion-resistant rust layer 3 with a fine grain by the effects of calcium oxide and either metal sulfate or phosphoric acid that exist in the organic resin coating film of the present invention. However, once cracking or pitting occurs for some reason on the surface of the high corrosion-resistant rust layer 3 that was created as outlined, the ability of normal steel 1 in recreating a high corrosion-resistant rust layer 3 on the damaged part is insufficient. Thus, weather-resistant steel 1 is preferred.

EXAMPLES

Table 1 shows chemical ingredients of tested steel materials used in examples of the present invention and Table 2 shows pretreatment of testing plates. Table 3 shows resins used as a coating material. The size of the testing plates is 200×100×3.5 mm. In the case of pretreatment X, rust was removed from the surface by shotblasting before the coating treatment is performed. In the case of pretreatment Y, among rusts which were formed earlier by exposure, rusts that are easily removed were with a wire brush, and then a coating treatment was performed.

TABLE 1

CHEMICAL COMPOUND OF TESTING STEEL MATERIALS (mass %)

| | C | Si | Mn | P | S | Al | N | Cr | Ni | Cu |
|---|---|---|---|---|---|---|---|---|---|---|
| ① weather resistant steel | 0.10 | 0.20 | 0.64 | 0.03 | 0.004 | 0.01 | 0.003 | 0.41 | 0.14 | 0.33 |
| ② normal steel | 0.11 | 0.15 | 0.31 | 0.005 | 0.004 | 0.02 | 0.002 | 0.01 | 0.01 | 0.01 |

TABLE 2

PRETREATMENT METHODS OF TESTING PLATES

| | |
|---|---|
| X | Shot-blasted |
| Y | a rust layer was formed beforehand by exposure for 60 days at the same site of exposing examination |

TABLE 3

RESINS OF COATING MATERIAL

| | |
|---|---|
| A | vinylbutyral resin |
| B | epoxy resin |
| C | urethane resin |
| D | phthalic acid resin |

TABLE 4

CONDITIONS OF PREPARATION OF TESTING PLATES FOR EXAMINATION OF COATED STEEL AND THE RESULT OF EXPOSING EXAMINATION

| test No. | | 1 | 2 | 3 | 4 | 5 | 6 | 7 | 8 | 9 | 10 | 11 |
|---|---|---|---|---|---|---|---|---|---|---|---|---|
| testing steel material | | ① | ① | ① | ① | ① | ① | ① | ① | ① | ① | ① |
| pretreatment | | X | X | X | X | X | X | X | X | X | X | X |
| resin type | | A | A | A | A | A | A | A | A | A | A | A |
| Composition of coating film | resin type | 86.8 | 86.8 | 86.8 | 86.6 | 86.6 | 86.6 | 40 | 40 | 40 | 40 | 40 |
| | calcium oxide | 0.1 | 0.1 | 0.1 | 0.1 | 0.1 | 0.1 | 29 | 29 | 29 | 29 | 29 |
| | aluminum sulfate | 0.1 | | | | | | 29 | | | | |
| | nickel sulfate | | 0.1 | | | | | | 29 | | | |
| | copper sulfate | | | 0.1 | | | | | | 29 | | |
| | chromium sulfate | | | | 0.1 | | | | | | 29 | |
| | cobalt sulfate | | | | | 0.1 | | | | | | 29 |
| | phosphoric acid | | | | | | 0.1 | | | | | |
| | Indian red | 5 | 5 | 5 | 5 | 5 | 5 | | | | | |
| | silica | 5 | 5 | 5 | 5 | 5 | 5 | | | | | |
| | zinc chromate | 2 | 2 | 2 | 2 | 2 | 2 | 1 | 1 | 1 | 1 | 1 |
| | $Fe_3O_4$ | | | | | | | | | | | |
| | other additive(s) | 1 | 1 | 1 | 1 | 1 | 1 | 1 | 1 | 1 | 1 | 1 |
| thickness of coating film ($\mu$m) | | 25 | 25 | 25 | 25 | 25 | 25 | 25 | 25 | 25 | 25 | 25 |
| existence of a rust layer | | + | + | + | + | + | + | + | + | + | + | + |
| decreased amount of thickness of plates ($\mu$m) | | 3 | 4 | 4 | 3 | 4 | 4 | 3 | 2 | 3 | 2 | 3 |
| | | | | | | | examples of the present invention | | | | | |

Figures of compound of coating films are wt %.

Formation of a rust layer was checked by sectional observation about the surface of a testing steel with a field radiation-typed scanning electron microscope at a magnifying power of 50,000, and when a rust layer was confirmed, it was judged rust layer existed.

TABLE 5

CONDITIONS OF PREPARATION OF TESTING PLATES FOR EXAMINATION OF COATED STEEL AND THE RESULT OF EXPOSING EXAMINATION

| test No. | | 12 | 13 | 14 | 15 | 16 | 17 | 18 | 19 | 20 | 21 | 22 |
|---|---|---|---|---|---|---|---|---|---|---|---|---|
| testing steel material | | ① | ① | ① | ① | ① | ① | ① | ① | ① | ① | ① |
| pretreatment | | X | X | X | X | X | X | X | X | X | X | X |
| resin type | | A | A | A | A | A | A | A | A | A | A | A |
| composition of coating film | resin type | 40 | 57 | 57 | 57 | 57 | 57 | 72 | 72 | 72 | 74 | 74 |
| | calcium oxide | 29 | 10 | 10 | 10 | 10 | 10 | 5 | 5 | 5 | 10 | 10 |
| | aluminum sulfate | | 10 | | | | 10 | 5 | | | 3 | |
| | nickel sulfate | | 10 | 10 | | | | | 5 | | 3 | 3 |
| | copper sulfate | | | 10 | 10 | | | 5 | | 5 | 3 | 3 |
| | chromium sulfate | | | | 10 | 10 | | | 5 | | | 3 |
| | cobalt sulfate | | | | | 10 | 10 | | | 5 | | |
| | phosphoric acid | 29 | | | | | 10 | | | | | |
| | Indian red | | 5 | 5 | 5 | 5 | 5 | 5 | 5 | 5 | 2 | 2 |
| | silica | | 5 | 5 | 5 | 5 | 5 | 5 | 5 | 5 | 2 | 2 |
| | zinc chromate | 1 | 2 | 2 | 2 | 2 | 2 | 2 | 2 | 2 | 2 | 2 |
| | $Fe_3O_4$ | | | | | | | | | | | |
| | other additive(s) | 1 | 1 | 1 | 1 | 1 | 1 | 1 | 1 | 1 | 1 | 1 |
| thickness of coating film ($\mu$m) | | 25 | 25 | 25 | 25 | 25 | 25 | 25 | 25 | 25 | 25 | 25 |
| existence of a rust layer | | + | + | + | + | + | + | + | + | + | + | + |

TABLE 5-continued

CONDITIONS OF PREPARATION OF TESTING PLATES FOR EXAMINATION
OF COATED STEEL AND THE RESULT OF EXPOSING EXAMINATION

| test No. | 12 | 13 | 14 | 15 | 16 | 17 | 18 | 19 | 20 | 21 | 22 |
|---|---|---|---|---|---|---|---|---|---|---|---|
| decreased amount of thickness of plates ($\mu$m) | 2 | 2 | 1 | 2 | 2 | 2 | 3 | 2 | 1 | 1 | 2 | examples of the present invention

Figures of compound of coating films are wt %.
Formation of a rust layer was checked by sectional observation about the surface of a testing steel with a field radiation-typed scanning electron microscope at a magnifying power of 50,000, and when a rust layer was confirmed, it was judged rust layer existed.

TABLE 6

CONDITIONS OF PREPARATION OF TESTING PLATES FOR EXAMINATION
OF COATED STEEL AND THE RESULT OF EXPOSING EXAMINATION

| test No. | | 23 | 24 | 25 | 26 | 27 | 28 | 29 | 30 | 31 | 32 | 33 |
|---|---|---|---|---|---|---|---|---|---|---|---|---|
| testing steel material | | ① | ① | ① | ① | ① | ① | ① | ① | ① | ① | ① |
| pretreatment | | X | X | X | X | X | X | Y | Y | Y | Y | Y |
| resin type | | A | A | A | A | A | A | A | A | A | A | A |
| composition of coating film | resin type | 66 | 39 | 81 | 53 | 64 | 64 | 86.8 | 86.8 | 86.8 | 86.6 | 86.6 |
| | calcium oxide | 15 | 15 | 12 | 15 | 5 | 5 | 0.1 | 0.1 | 0.1 | 0.1 | 0.1 |
| | aluminum sulfate | | 20 | 2 | | 5 | 5 | 0.1 | | | | |
| | nickel sulfate | | 10 | 2 | | 5 | 5 | | 0.1 | | | |
| | copper sulfate | 3 | | | | 1 | | | | 0.1 | | |
| | chromium sulfate | 3 | 10 | 2 | 15 | 5 | 5 | | | | 0.1 | |
| | cobalt sulfate | 3 | 5 | | | 5 | 5 | | | | | 0.1 |
| | phosphoric acid | 3 | | | 10 | 3 | 4 | | | | | |
| | Indian red | 2 | | | 2 | 2 | 2 | 5 | 5 | 5 | 5 | 5 |
| | silica | 2 | | | 2 | 2 | 2 | 5 | 5 | 5 | 5 | 5 |
| | zinc chromate | 2 | | | 2 | 2 | 2 | 2 | 2 | 2 | 2 | 2 |
| | Fe$_3$O$_4$ | | | | | | | | | | | |
| | other additive(s) | 1 | 1 | 1 | 1 | 1 | 1 | 1 | 1 | 1 | 1 | 1 |
| thickness of coating film ($\mu$m) | | 25 | 25 | 25 | 25 | 25 | 25 | 25 | 25 | 25 | 25 | 25 |
| existence of a rust layer | | + | + | + | + | + | + | + | + | + | + | + |
| decreased amount of thickness of plates ($\mu$m) | | 1 | 1 | 1 | 2 | 1 | 1 | 2 | 2 | 2 | 2 | 2 | examples of the present invention

Figures of compound of coating films are wt %.
Formation of a rust layer was checked by sectional observation about the surface of a testing steel with a field radiation-typed scanning electron microscope at a magnifying power of 50,000, and when a rust layer was confirmed, it was judged rust layer existed.

TABLE 7

CONDITIONS OF PREPARATION OF TESTING PLATES FOR EXAMINATION
OF COATED STEEL AND THE RESULT OF EXPOSING EXAMINATION

| test No. | | 34 | 35 | 36 | 37 | 38 | 39 | 40 | 41 | 42 | 43 | 44 |
|---|---|---|---|---|---|---|---|---|---|---|---|---|
| testing steel material | | ① | ① | ① | ① | ① | ① | ① | ② | ② | ② | ② |
| pretreatment | | Y | Y | Y | Y | Y | Y | Y | X | X | X | X |
| resin type | | A | A | A | A | A | A | A | A | A | A | A |
| composition of coating film | resin type | 86.6 | 40 | 40 | 40 | 40 | 40 | 40 | 86.8 | 86.8 | 86.8 | 86.6 |
| | calcium oxide | 0.1 | 29 | 29 | 29 | 29 | 29 | 29 | 0.1 | 0.1 | 0.1 | 0.1 |
| | aluminum sulfate | | 29 | | | | | | 0.1 | | | |
| | nickel sulfate | | | 29 | | | | | | 0.1 | | |
| | copper sulfate | | | | 29 | | | | | | 0.1 | |
| | chromium sulfate | | | | | 29 | | | | | | 0.1 |
| | cobalt sulfate | | | | | | 29 | | | | | |

TABLE 7-continued

CONDITIONS OF PREPARATION OF TESTING PLATES FOR EXAMINATION
OF COATED STEEL AND THE RESULT OF EXPOSING EXAMINATION

| test No. | | 34 | 35 | 36 | 37 | 38 | 39 | 40 | 41 | 42 | 43 | 44 |
|---|---|---|---|---|---|---|---|---|---|---|---|---|
| | phosphoric acid | 0.1 | | | | | | 29 | | | | |
| | Indian red | 5 | | | | | | | 5 | 5 | 5 | 5 |
| | silica | 5 | | | | | | | 5 | 5 | 5 | 5 |
| | zinc chromate | 2 | 1 | 1 | 1 | 1 | 1 | 1 | 2 | 2 | 2 | 2 |
| | $Fe_3O_4$ | | | | | | | | | | | |
| | other additive(s) | 1 | 1 | 1 | 1 | 1 | 1 | 1 | 1 | 1 | 1 | 1 |
| thickness of coating film ($\mu m$) | | 25 | 25 | 25 | 25 | 25 | 25 | 25 | 25 | 25 | 25 | 25 |
| existence of a rust layer | | + | + | + | + | + | + | + | + | + | + | + |
| decreased amount of thickness of plates ($\mu m$) | | 2 | 2 | 1 | 2 | 1 | 2 | 2 | 1 | 3 | 4 | 3 |
| | | | | | | | examples of the present invention | | | | | |

Figures of compound of coating films are wt %.
Formation of a rust layer was checked by sectional observation about the surface of a testing steel with a field radiation-typed scanning electron microscope at a magnifying power of 50,000, and when a rust layer was confirmed, it was judged rust layer existed.

TABLE 8

CONDITIONS OF PREPARATION OF TESTING PLATES FOR EXAMINATION
OF COATED STEEL AND THE RESULT OF EXPOSING EXAMINATION

| test No. | | 45 | 46 | 47 | 48 | 49 | 50 | 51 | 52 | 53 | 54 | 55 |
|---|---|---|---|---|---|---|---|---|---|---|---|---|
| testing steel material | | ② | ② | ① | ① | ① | ① | ① | ① | ① | ① | ① |
| pretreatment | | X | X | X | X | X | X | X | X | X | X | X |
| resin type | | A | A | B | B | B | B | B | B | C | C | C |
| composition of coating film | resin type | 86.6 | 86.6 | 86.8 | 86.8 | 86.8 | 86.8 | 86.6 | 86.6 | 86.8 | 86.8 | 86.8 |
| | calcium oxide | 0.1 | 0.1 | 0.1 | 0.1 | 0.1 | 0.1 | 0.1 | 0.1 | 0.1 | 0.1 | 0.1 |
| | aluminum sulfate | | | 0.1 | | | | | | 0.1 | | |
| | nickel sulfate | | | | 0.1 | | | | | | 0.1 | |
| | copper sulfate | | | | | 0.1 | | | | | | 0.1 |
| | chromium sulfate | | | | | | 0.1 | | | | | |
| | cobalt sulfate | 0.1 | | | | | | 0.1 | | | | |
| | phosphoric acid | | 0.1 | | | | | | 0.1 | | | |
| | Indian red | 5 | 5 | 5 | 5 | 5 | 5 | 5 | 5 | 5 | 5 | 5 |
| | silica | 5 | 5 | 5 | 5 | 5 | 5 | 5 | 5 | 5 | 5 | 5 |
| | zinc chromate $Fe_3O_4$ | 2 | 2 | 2 | 2 | 2 | 2 | 2 | 2 | 2 | 2 | 2 |
| | other additive(s) | 1 | 1 | 1 | 1 | 1 | 1 | 1 | 1 | 1 | 1 | 1 |
| thickness of coating film ($\mu m$) | | 25 | 25 | 25 | 25 | 25 | 25 | 25 | 25 | 25 | 25 | 25 |
| existence of a rust layer | | + | + | + | + | + | + | + | + | + | + | + |
| decreased amount of thickness of plates ($\mu m$) | | 3 | 2 | 4 | 3 | 4 | 4 | 3 | 2 | 4 | 3 | 4 |
| | | | | | | | examples of the present invention | | | | | |

Figures of compound of coating films are wt %.
Formation of a rust layer was checked by sectional observation about the surface of a testing steel with a field radiation-typed scanning electron microscope at a magnifying power of 50,000, and when a rust layer was confirmed, it was judged rust layer existed.

TABLE 9

CONDITIONS OF PREPARATION OF TESTING PLATES FOR EXAMINATION
OF COATED STEEL AND THE RESULT OF EXPOSING EXAMINATION

| test No. | 56 | 57 | 58 | 59 | 60 | 61 | 62 | 63 | 64 | 65 | 66 |
|---|---|---|---|---|---|---|---|---|---|---|---|
| testing steel material | ① | ① | ① | ① | ① | ① | ① | ① | ① | ① | ① |

TABLE 9-continued

CONDITIONS OF PREPARATION OF TESTING PLATES FOR EXAMINATION OF COATED STEEL AND THE RESULT OF EXPOSING EXAMINATION

| test No. | | 56 | 57 | 58 | 59 | 60 | 61 | 62 | 63 | 64 | 65 | 66 |
|---|---|---|---|---|---|---|---|---|---|---|---|---|
| pretreatment | | X | X | X | X | X | X | X | X | X | X | X |
| resin type | | C | C | C | D | D | D | D | D | D | A | A |
| composition of coating film | resin type | 86.6 | 86.6 | 86.6 | 86.8 | 86.8 | 86.8 | 86.6 | 86.6 | 86.8 | 86.8 | 86.8 |
| | calcium oxide | 0.1 | 0.1 | 0.1 | 0.1 | 0.1 | 0.1 | 0.1 | 0.1 | 0.1 | 0.1 | 0.1 |
| | aluminum sulfate | | | | 0.1 | | | | | | 0.1 | |
| | nickel sulfate | | | | | 0.1 | | | | | | 0.1 |
| | copper sulfate | | | | | | 0.1 | | | | | |
| | chromium sulfate | 0.1 | | | | | | 0.1 | | | | |
| | cobalt sulfate | | 0.1 | | | | | | 0.1 | | | |
| | phosphoric acid | | | 0.1 | | | | | | 0.1 | | |
| | Indian red | 5 | 5 | 5 | 5 | 5 | 5 | 5 | 5 | 5 | 5 | 5 |
| | silica | 5 | 5 | 5 | 5 | 5 | 5 | 5 | 5 | 5 | 5 | 5 |
| | zinc chromate | 2 | 2 | 2 | 2 | 2 | 2 | 2 | 2 | 2 | 2 | 2 |
| | $Fe_3O_4$ | | | | | | | | | | | |
| | other additive(s) | 1 | 1 | 1 | 1 | 1 | 1 | 1 | 1 | 1 | 1 | 1 |
| thickness of coating film ($\mu$m) | | 25 | 25 | 25 | 25 | 25 | 25 | 25 | 25 | 25 | 1 | 1 |
| existence of a rust layer | | + | + | + | + | + | + | + | + | + | + | + |
| decreased amount of thickness of plates ($\mu$m) | | 3 | 3 | 4 | 3 | 4 | 2 | 4 | 4 | 3 | 4 | 4 | examples of the present invention

Figures of compound of coating films are wt %.
Formation of a rust layer was checked by sectional observation about the surface of a testing steel with a field radiation-typed scanning electron microscope at a magnifying power of 50,000, and when a rust layer was confirmed, it was judged rust layer existed.

TABLE 10

CONDITIONS OF PREPARATION OF TESTING PLATES FOR EXAMINATION OF COATED STEEL AND THE RESULT OF EXPOSING EXAMINATION

| test No. | | 67 | 68 | 69 | 70 | 71 | 72 | 73 | 74 | 75 | 76 |
|---|---|---|---|---|---|---|---|---|---|---|---|
| testing steel material | | ① | ① | ① | ① | ① | ① | ① | ① | ① | ① |
| pretreatment | | X | X | X | X | X | X | X | X | X | X |
| resin type | | A | A | A | A | A | A | A | A | A | A |
| composition of coating film | resin type | 86.8 | 86.6 | 86.6 | 86.6 | 86.8 | 86.8 | 86.8 | 86.6 | 86.6 | 86.6 |
| | calcium oxide | 0.1 | 0.1 | 0.1 | 0.1 | 0.1 | 0.1 | 0.1 | 0.1 | 0.1 | 0.1 |
| | aluminum sulfate | | | | | 0.1 | | | | | |
| | nickel sulfate | | | | | | 0.1 | | | | |
| | copper sulfate | 0.1 | | | | | | 0.1 | | | |
| | chromium sulfate | | 0.1 | | | | | | 0.1 | | |
| | cobalt sulfate | | | 0.1 | | | | | | 0.1 | |
| | phosphoric acid | | | | 0.1 | | | | | | 0.1 |
| | Indian red | 5 | 5 | 5 | 5 | 5 | 5 | 5 | 5 | 5 | 5 |
| | silica | 5 | 5 | 5 | 5 | 5 | 5 | 5 | 5 | 5 | 5 |
| | zinc chromate | 2 | 2 | 2 | 2 | 2 | 2 | 2 | 2 | 2 | 2 |
| | $Fe_3O_4$ | | | | | | | | | | |
| | other additive(s) | 1 | 1 | 1 | 1 | 1 | 1 | 1 | 1 | 1 | 1 |
| thickness of coating film ($\mu$m) | | 1 | 1 | 1 | 1 | 200 | 200 | 200 | 200 | 200 | 200 |
| existence of a rust layer | | + | + | + | + | + | + | + | + | + | + |
| decreased amount of thickness of plates ($\mu$m) | | 4 | 4 | 4 | 4 | 3 | 3 | 2 | 2 | 2 | 4 | examples of the present invention

Figures of compound of coating films are wt %.
Formation of a rust layer was checked by sectional observation about the surface of a testing steel with a field radiation-typed scanning electron microscope at a magnifying power of 50,000, and when a rust layer was confirmed, it was judged rust layer existed.

TABLE 11

CONDITIONS OF PREPARATION OF TESTING PLATES FOR EXAMINATION OF COATED STEEL AND THE RESULT OF EXPOSING EXAMINATION

| test No. | | 77 | 78 | 79 | 80 | 81 | 82 | 83 | 84 | 85 | 86 |
|---|---|---|---|---|---|---|---|---|---|---|---|
| testing steel material | | ① | ① | ① | ① | ① | ① | ① | ① | ① | ① |
| pretreatment | | X | X | X | X | X | X | X | X | X | X |
| resin type | | A | A | A | A | A | A | A | A | A | A |
| composition of coating film | resin type | 34 | 34 | 39 | 33 | 29 | 37 | 49 | 34 | 79 | |
| | calcium oxide | 9 | 9 | 29 | | | 32 | 29 | 28 | | |
| | aluminum sulfate | 9 | 9 | | 29 | | 4 | | 6 | | |
| | nickel sulfate | 9 | 9 | | | 29 | 4 | | 6 | | |
| | copper sulfate | 8 | 8 | | | 29 | 4 | | 6 | | |
| | chromium sulfate | 8 | 8 | | 29 | | 4 | | 6 | | |
| | cobalt sulfate | 8 | 8 | | | | 4 | | 6 | | |
| | phosphoric acid | 8 | 8 | | | | 4 | | 6 | | |
| | Indian red | 2 | 2 | | | 2 | 2 | 5 | | 5 | |
| | silica | 3 | 3 | | | 2 | 3 | 5 | | 5 | |
| | zinc chromate | 1 | 1 | 1 | 8 | 6 | 1 | 1 | 1 | 5 | |
| | $Fe_3O_4$ | | | | | 2 | | 5 | | 5 | |
| | barium sulfate | | | 30 | | | | 5 | | | |
| | other additive(s) | 1 | 1 | 1 | 1 | 1 | 1 | 1 | 1 | 1 | |
| thickness of coating film (μm) | | 0.5 | 205 | 50 | 50 | 50 | 50 | 50 | 50 | 50 | 0 |
| existence of a rust layer | | + | − | + | + | + | + | + | + | + | + |
| decreased amount of thickness of plates (μm) | | 725 | 0 | 734 | 751 | 625 | 784 | 798 | 847 | 914 | 1054 |
| | | | | | | | | | | comparative examples | |

Figures of compound of coating films are wt %.
Formation of a rust layer was checked by sectional observation about the surface of a testing steel with a field radiation-typed scanning electron microscope at a magnifying power of 50,000, and when a rust layer was confirmed, it was judged rust layer existed.

TABLE 12

CONDITIONS OF PREPARATION OF TESTING PLATES FOR EXAMINATION OF COATED STEEL AND THE RESULT OF EXPOSING EXAMINATION

| test No. | | 87 | 88 | 89 | 90 | 91 | 92 | 93 | 94 | 95 | 96 |
|---|---|---|---|---|---|---|---|---|---|---|---|
| testing steel material | | ① | ① | ① | ① | ① | ① | ① | ① | ① | ① |
| pretreatment | | Y | Y | Y | Y | Y | Y | Y | Y | Y | Y |
| resin type | | A | A | A | A | A | A | A | A | A | A |
| composition of coating film | resin type | 34 | 34 | 39 | 33 | 29 | 37 | 49 | 34 | 79 | |
| | calcium oxide | 9 | 9 | 29 | | | 32 | 29 | 28 | | |
| | aluminum sulfate | 9 | 9 | | 29 | | 4 | | 6 | | |
| | nickel sulfate | 9 | 9 | | | 29 | 4 | | 6 | | |
| | copper sulfate | 8 | 8 | | | 29 | 4 | | 6 | | |
| | chromium sulfate | 8 | 8 | | 29 | | 4 | | 6 | | |
| | cobalt sulfate | 8 | 8 | | | | 4 | | 6 | | |
| | phosphoric acid | 8 | 8 | | | | 4 | | 6 | | |
| | Indian red | 2 | 2 | | | 2 | 2 | 5 | | 5 | |
| | silica | 3 | 3 | | | 2 | 3 | 5 | | 5 | |
| | zinc chromate | 1 | 1 | 1 | 8 | 6 | 1 | 1 | 1 | 5 | |
| | $Fe_3O_4$ | | | | | 2 | | 5 | | 5 | |
| | barium sulfate | | | 30 | | | | 5 | | | |
| | other additive(s) | 1 | 1 | 1 | 1 | 1 | 1 | 1 | 1 | 1 | 1 |
| thickness of coating film (μm) | | 0.5 | 205 | 50 | 50 | 50 | 50 | 50 | 50 | 50 | 0 |
| existence of a rust layer | | + | − | + | + | + | + | + | + | + | + |

TABLE 12-continued

CONDITIONS OF PREPARATION OF TESTING PLATES FOR EXAMINATION OF COATED STEEL AND THE RESULT OF EXPOSING EXAMINATION

| test No. | 87 | 88 | 89 | 90 | 91 | 92 | 93 | 94 | 95 | 96 |
|---|---|---|---|---|---|---|---|---|---|---|
| decreased amount of thickness of plates ($\mu$m) | 799 | 0 | 757 | 774 | 615 | 749 | 875 | 894 | 945 | 1211 |
| | | | | | comparative examples | | | | | |

Figures of compound of coating films are wt %.
Formation of a rust layer was checked by sectional observation about the surface of a testing steel with a field radiation-typed scanning electron microscope at a magnifying power of 50,000, and when a rust layer was confirmed, it was judged rust layer existed.

Tables 4 through 12 show the conditions for the preparation of plates for the examination of coated steel and the results. Metal sulfates used in the present invention are aluminum sulfate, Nickel(II) sulfate, Cobalt(II) sulfate, Chromium(III) sulfate, and Copper(II) sulfate. Cobalt(III) sulfate can also be used in place of Cobalt(II) sulfate and expected to show the same effect as it is easily reduced to Cobalt(II) sulfate.

A paint having a viscosity of 200–1000 cps (measured by viscometer type B) prepared by adding suitable amount of solvent to a resin/additives composition was applied to testing plates by air spraying. These plates for the examination of coated steel were then exposed outside under the same conditions for two years at 8 m away from the seashore on coastal region in Obama city, Fukui prefecture. The amount of atmosphere salinity at this exposure site was 1.22 mg/square decimeter/day, which meant it was a severely corrosive environment. After exposure, rust was removed from the testing plates in a mixed solution of 2-ammonium citrate and a small amount of corrosion inhibiting solution. Then the decreased thickness of the testing plates in a period of exposure was measured by comparing the weights of ground iron alone before and after the exposure. In the case of pretreatment Y, decreased thickness of testing plates during a period of exposure was measured by first using other testing plates to measure how much the thickness had decreased in a period of time for exposure to form rust layers beforehand, and then use such figures as standards. In addition, formation of a rust layer was checked by sectional observation using a field radiation-typed scanning electron microscope.

As a result, in examples 1 through 76 of the present invention, though rust layers were formed and corrosive reaction of steel proceeded, the thickness of plates decreased only slightly. Namely, it is obvious that rust layers created in examples 1 through 76 of the present invention are high corrosion-resistant rust layers having high corrosion resistance even in a severely corrosive environment. Especially, rust layers created by organic resin paints containing both metal sulfate and phosphoric acid were more corrosion resistance by their synergistic effect. Further, the plates reduction in thickness was extremely less than those containing either metal sulfate or phosphoric acid solely.

On the other hand, shown in comparative examples 77 through 96, when a paint contained calcium oxide, metal sulfate having suitable solubility to water, and phosphoric acid out of the suitable range, or the thickness of a coating film was out of the suitable range, a high corrosion-resistant rust layer was not formed. Even though a rust layer was formed, plate thickness decreased dramatically. It clearly meant that a high corrosion-resistant rust layer was not formed in those comparative examples.

As described above, a coated steel having atmospheric corrosion resistance by an organic resin paint can form a high corrosion resistant rust layer in its early stage even in a severe corrosive environment such as environment that includes a high amount of atmosphere salinity. The organic resin paint has by weight, 0.2 to 60% of the total with a composition of (i) 0.1–30% calcium oxide, (ii) metal sulfate, whose solubility is 1 g or more in 100 g of water at 5 degrees C. and (iii) at least one or more kind(s) of phosphoric acid. Further, the thickness of the dried coating film covering a surface of a steel or a surface of a rust layer over a steel is between 1 $\mu$m and 200 $\mu$m. The treatment is economical and easily applied, can be applied widely to steel materials and others. Moreover, as formation of a high corrosion-resistant rust layer completes in its early stage, another coating can be applied freely onto the coating of the organic resin paint of the present invention. In that occasion, as corrosion of foundation is inhibited by the high corrosion-resistant rust layer, life of finishing coating, which is often applied considering the appearance, will be prolonged dramatically. By the reasons mentioned above, maintenance relating to corrosion of a steel material will become unnecessary or decreased remarkably.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A coated steel having atmospheric corrosion resistance comprising:
   a steel body; and
   a dried organic paint layer coating on said steel body, said organic paint layer when applied including 0.1–30% by weight of calcium oxide, and 0.2 to 60% by weight of a combination of metal sulfate and phosphoric acid, said metal sulfate having a solubility of 1 g or more in 100 g of water at 5 degrees centigrade, said organic paint layer being in a range of 1 $\mu$m and 200 $\mu$m in thickness when dried.

2. A coated steel according to claim 1, wherein
said steel body has a rust layer; and
said organic paint layer coats said dried rust layer.

3. A coated steel according to claim 1, wherein
said metal sulfate is one or more selected from the group consisting of aluminum sulfate, nickel sulfate, copper sulfate, chromium sulfate, and cobalt sulfate.

4. A coated steel having atmospheric corrosion resistance comprising:
a steel body; and
a dried organic paint layer coating on said steel body, said organic paint layer when applied including 0.1–30% by weight of calcium oxide, and 0.2 to 60% by weight of metal sulfate having a solubility of 1 g or more in 100 g of water at 5 degrees centigrade, said organic paint layer being in a range of 1 $\mu$m and 200 $\mu$m in thickness when dried.

5. A coated steel according to claim 4, wherein
said steel body has a rust layer; and
said organic paint layer coats said dried rust layer.

6. A coated steel according to claim 4, wherein
said metal sulfate is one or more selected from the group consisting of aluminum sulfate, nickel sulfate, copper sulfate, chromium sulfate, and cobalt sulfate.

7. A coated steel having atmospheric corrosion resistance comprising:
a steel body; and
a dried organic paint layer coating on said steel body, said organic paint layer when applied including 0.1–30% by weight of calcium oxide, and 0.2 to 60% by weight of phosphoric acid, said organic paint layer being in a range of 1 $\mu$m and 200 $\mu$m in thickness when dried.

8. A coated steel according to claim 7, wherein
said steel body has a rust layer; and
said organic paint layer coats said dried rust layer.

* * * * *